US011524303B2

(12) United States Patent
Smeets et al.

(10) Patent No.: US 11,524,303 B2
(45) Date of Patent: Dec. 13, 2022

(54) TOOL SYSTEM

(71) Applicant: Betek GmbH & Co. KG, Aichhalden (DE)

(72) Inventors: Florian Smeets, Dossenheim (DE); Ulrich Kraemer, Wolfach (DE)

(73) Assignee: Betek GmbH & Co. KG

( * ) Notice: Subject to any disclaimer, the term of this patent is extended or adjusted under 35 U.S.C. 154(b) by 354 days.

(21) Appl. No.: 15/967,873

(22) Filed: May 1, 2018

(65) Prior Publication Data

US 2018/0280988 A1 Oct. 4, 2018

Related U.S. Application Data

(63) Continuation of application No. PCT/EP2016/076399, filed on Nov. 2, 2016.

(30) Foreign Application Priority Data

Nov. 6, 2015 (DE) ..................... 10 2015 119 119.9

(51) Int. Cl.
*B02C 18/18* (2006.01)
*B02C 18/14* (2006.01)

(52) U.S. Cl.
CPC ............ *B02C 18/18* (2013.01); *B02C 18/145* (2013.01)

(58) Field of Classification Search
CPC ....... B02C 18/18; B02C 18/145; B02C 13/28; E21C 35/18; E21C 35/183

(Continued)

(56) References Cited

U.S. PATENT DOCUMENTS 1,908,161 A * 5/1933 Meutsch ............... E21C 35/183
299/112 R
3,143,177 A * 8/1964 Galorneau ............. E21C 35/19
175/413

(Continued)

FOREIGN PATENT DOCUMENTS

DE 10 2013 110 289 A1 3/2015
WO 01/23708 A1 4/2001

(Continued)

OTHER PUBLICATIONS

International Search Report and Written Opinion (Application No. PCT/EP2016/076399) dated Feb. 10, 2017.

(Continued)

*Primary Examiner* — Jessica Cahill
*Assistant Examiner* — Smith Oberto Bapthelus
(74) *Attorney, Agent, or Firm* — Lucian Wayne Beavers; Patterson Intellectual Property Law, PC

(57) ABSTRACT

The invention relates to a tool for securing on a tool holder of a machine tool for machining vegetable and/or mineral materials, comprising a tool body which is equipped with a machining attachment that points in a tool feeding direction and comprises a cutting region, in particular a cutting element, and on which a fitting element for meshing with a mating element provided on the tool holder is formed on a support surface facing the tool holder. The dependability and operational reliability when using a machine tool can be ensured if the fitting element has at least two molded regions with different contour regions over the vertical course of the fitting element with respect to the support surface.

19 Claims, 6 Drawing Sheets

(58) Field of Classification Search
USPC ............. 241/282.2, 298, 294; 299/79.1, 87.1
See application file for complete search history.

(56) References Cited

U.S. PATENT DOCUMENTS

| | | | | | |
|---|---|---|---|---|---|
| 4,159,746 | A | * | 7/1979 | Wrulich | E21C 35/183 175/354 |
| 4,162,770 | A | * | 7/1979 | Lewis | B02C 18/184 241/191 |
| 4,346,934 | A | * | 8/1982 | College | E21C 35/197 175/354 |
| 4,880,278 | A | * | 11/1989 | Tomlinson | E21B 10/567 299/112 R |
| 5,161,627 | A | * | 11/1992 | Burkett | E21C 35/183 299/111 |
| 6,546,977 | B1 | * | 4/2003 | Monyak | A01G 23/067 144/235 |
| 6,742,735 | B2 | * | 6/2004 | Sollami | B21J 5/02 241/294 |
| 7,222,808 | B2 | * | 5/2007 | Edwards | A01B 33/103 241/294 |
| 7,281,676 | B1 | * | 10/2007 | Bennington | A01G 23/093 241/294 |
| 9,144,922 | B2 | * | 9/2015 | Roth | E21C 35/18 |
| 9,399,914 | B2 | * | 7/2016 | Roth | E21C 35/197 |
| 9,943,037 | B2 | * | 4/2018 | Stanley | A01G 23/093 |
| 2006/0118672 | A1 | * | 6/2006 | Hickey | B02C 18/18 241/294 |
| 2006/0208120 | A1 | * | 9/2006 | McGehee | B27G 13/10 241/294 |
| 2007/0090680 | A1 | * | 4/2007 | Ojanen | E21C 35/18 299/106 |
| 2007/0181725 | A1 | * | 8/2007 | Edwards | A01B 33/103 241/294 |
| 2008/0041027 | A1 | * | 2/2008 | Qualie | B02C 18/18 56/289 |
| 2008/0061176 | A1 | * | 3/2008 | Smith | B02C 13/288 241/189.1 |
| 2011/0062266 | A1 | * | 3/2011 | Smith | B02C 18/145 241/291 |
| 2011/0080037 | A1 | * | 4/2011 | Kelly | E21C 35/187 299/81.1 |
| 2011/0100658 | A1 | * | 5/2011 | Stanley | A01G 23/093 172/548 |
| 2011/0233987 | A1 | * | 9/2011 | Maushart | E21C 35/18 299/110 |
| 2013/0161428 | A1 | * | 6/2013 | Hongo | B02C 13/2804 241/73 |
| 2013/0307317 | A1 | * | 11/2013 | Bookhamer | E21C 35/183 299/104 |
| 2014/0232172 | A1 | * | 8/2014 | Roth | E21C 35/18 299/106 |
| 2015/0078843 | A1 | * | 3/2015 | Diego | B23C 5/22 407/103 |
| 2015/0315910 | A1 | * | 11/2015 | Sollami | E21C 35/19 299/105 |
| 2015/0345291 | A1 | * | 12/2015 | Roth | E21C 35/18 299/113 |
| 2016/0024917 | A1 | * | 1/2016 | Hall | E21C 35/183 299/105 |
| 2017/0074098 | A1 | * | 3/2017 | Roth | E21C 35/197 |
| 2017/0079219 | A1 | * | 3/2017 | Stanley | B02C 18/145 |
| 2017/0241265 | A1 | * | 8/2017 | Kraemer | E21C 35/183 |
| 2017/0342831 | A1 | * | 11/2017 | Weber | E21C 35/183 |
| 2018/0280988 | A1 | * | 10/2018 | Smeets | E21C 35/183 |

FOREIGN PATENT DOCUMENTS

| | | |
|---|---|---|
| WO | 2004/069502 A1 | 8/2004 |
| WO | 2005/043981 A2 | 5/2005 |

OTHER PUBLICATIONS

Canadian Office Action dated May 9, 2019 from a corresponding Canadian patent application (CA 3,004,515), 3 pages.
International Preliminary Report on Patentability (and English Translation from the Global Dossier) dated May 8, 2018 from a corresponding international patent application (PCT/EP2016/076399), 12 pages.

* cited by examiner

TOOL SYSTEM

CROSS REFERENCE TO RELATED APPLICATIONS

This application is a continuation of International Application No. PCT/EP2016/076399 filed Nov. 2, 2016, which designated the United States, and claims the benefit under 35 USC § 119(a)-(d) of German Application No. 10 2015 119 119.9 filed Nov. 6, 2015, the entireties of which are incorporated herein by reference.

FIELD OF THE INVENTION

The present invention relates to a tool for fastening on a tool holder of a machine tool for machining vegetable and/or mineral materials, having a tool body on which a machining attachment, which points in a tool feed direction, is realized with a cutting region, in particular, with a cutting element, and on which, on a support surface which faces the tool holder, a fitting element is realized for interlocking with a counter element provided on the tool holder. The present invention additionally relates to a corresponding tool system.

BACKGROUND OF THE INVENTION

Machine tools with such tools are used, for example, to shred tree or shrub material, for cultivating forest floors or crop land or for similar machining tasks, it also being possible, for example, to count road building and/or mining among the areas of use. In this connection, the tools contact stones or other hard materials of a vegetable or mineral nature such that they are exposed to a considerable amount of wear. As the wear on the tools far exceeds what is usual for the remaining outer machine parts, the tools are usually fastened on the machine by means of tool holders so that they can be replaced. In this case, the tool holders are fixed, for example, to a rotating or also a translational element of the machine tool or are integrated in the element or integrated directly on the machine tool. If a tool is worn, it is first of all released from the tool holder and the new tool is then mounted. Care must be taken in this case to ensure that a tool that is suitable for the machining task or the machine is always used. The use of an unsuitable tool can result in shortening the tool change interval, which, where applicable, has an unfavorable effect on the operating costs. In addition, a tool not designed for the load could be destroyed in operation and at the same time spraying parts could provide a serious safety hazard and risk of damage.

In order to support the use of a suitable tool on a corresponding machine tool, it is expedient to match the tool and the tool holder individually to one another as a result of a corresponding interface. DE 102013110289 A1, for example, thus discloses a cutting tool with a fastening portion in the form of an eight which rises above the support surface of the cutting tool. A corresponding receiving means, in which the fastening portion engages in a defined manner when mounted, is provided on a counter surface on the tool holder.

SUMMARY OF THE INVENTION

It is an object of the present invention to provide a tool or a tool system of the type mentioned in the introduction, with which assured reliability and operating safety can be ensured when a machine tool is used.

The object of the present invention is achieved as a result of the fitting element comprising at least two molded regions with contour regions which differ from one another over its vertical profile with reference to the support surface. Any surface which is surrounded by the external outline, i.e. the contour, of the respective molded region when viewed in top view (i.e. in the vertical direction) onto the fitting element is designated as a contour region in this context. Even geometrically similar contour regions are considered as different, for example, when the surfaces have an identical form, but one of the surfaces is smaller than the other (for example, a smaller square on a larger square). As a result of the solution according to the present invention, defined coding can be designed with reference to an interface between the tool and the tool holder. In this case, in an advantageous manner, along with the dimension directions in a plane parallel to the support surface, dimensions in the upward or downward directions, perpendicularly to the support surface, are additionally utilized. Defined interfaces to corresponding tool holders can thus also be provided in the case of a plurality of different tools such that the use of a suitable tool can be ensured on the respective machine tool. The tool holder, in this case, can be fastened on the machine in a releasable or non-releasable manner. Several such fitting elements and corresponding counter elements can also be provided on a tool/tool holder pairing.

In addition, the object of the present invention is achieved with a tool system having a tool and a tool holder of a machine tool for machining vegetable and/or mineral materials.

In an advantageous design variant of the present invention, the fitting element and the counter element on the tool holder are realized so as to complement one another for forming a positive locking and/or a non-positive locking connection. For example, transverse forces acting on the tool are thus able to be removed to the tool holder via the fitting element. In this way, the fitting element and the counter element can be integrated in an advantageous manner into a certain concept for force removal between the tool and the tool holder.

When the fitting element is realized as an attachment and the counter element as an indentation, improved guiding of a fastening means guided into the tool by the fitting element can be achieved, for example, as a result. However, the fitting element can also be realized as an indentation and the counter element as an attachment, which can also be advantageous in certain installation situations. Varying realizations in this respect can also be provided where there are multiple fitting elements and counter elements.

It is advantageous for simple assembly of the tool on the tool holder when, when looking in top view onto the fitting element, the contour of a second molded region which is spaced further from the support surface lies inside or at least in regions on the contour of a first molded region which is located closer to the support surface. This applies correspondingly to possible further molded regions which are spaced further from the support surface, with reference to their adjoining molded regions which are located closer to the support surface.

In a further preferred design variant, the molded regions are closed off over the vertical profile of the fitting element via plateau surfaces preferably with a substantially rectangular alignment with respect to the vertical profile, and/or merge into the next molded region via such plateau surfaces. "Substantially" means in this context that the direction component of the surface area progression of the plateau surfaces at right angles to the vertical profile is greater than the direction component in the direction of the vertical profile. In this way, a contour, which extends vertically at least in regions in a substantially stepped manner in the direction of the longitudinal center axis thereof, is produced in the vertical section of the fitting element. Defined heights of the molded regions and where applicable a defined transition to the respective next molded region can thus be obtained, which can be advantageous for defined supporting system.

When the molded regions have varying heights, this allows for a defined design of a supporting system to be provided, where applicable, via edge surfaces of the fitting element on corresponding edge counter surfaces of the counter element. The heights define the respective extents of the molded regions in the vertical direction and consequently the thickness thereof. A molded region is consequently a three-dimensional region, the outer periphery of which is defined substantially via its height and, with reference to its surface area in a preferred manner at right angles to the vertical profile of the fitting element, via its contour region.

In order to achieve a defined supporting system, it is additionally advantageous when the molded regions are bordered over their heights by edge surfaces which are aligned with respect to the vertical profile of the fitting element at least in regions parallel and/or conically tapering against the plateau surface of the respective fitting element. In addition, the edge surfaces can comprise via the respective heights also inclined and/or rounded regions such that variously formed regions can be provided via the height. If inclined and/or rounded regions are provided e.g. in transition regions, this can result in additional advantages for simple assembly.

When the contour of the molded regions is realized at least in regions in a polygonal manner and/or in a curved manner, this enables diverse design possibilities for the molded regions also with regard to their function when receiving and removing varying force components.

The contour regions of the molded regions can be advantageously realized in each case in a symmetrical manner and/or in a geometrically similar manner to one another. "Geometrically similar" means, in this context, that the contour regions can be merged together as a result of stretching or compressing and/or congruency imaging, i.e. displacements, rotations and/or mirroring. The transposing relates in this case to directions in space at right angles to the vertical profile of the fitting element which are designated, for example, as the y and z directions.

Further advantageous coding possibilities are produced when the contour regions are rotated by an angle with respect to one another about a rotational axis which extends parallel to the vertical direction with reference to reference points associated therewith and/or are arranged offset to one another in a direction directed at right angles to the vertical direction. Reference axes, in particular, symmetry axes, but also e.g. mirror axes or other definable axes, and/or centroids can be defined as reference points in this case. The offset, in this case, can be effected, for example, along a defined axis, for example, the centroid of a second contour region could be displaced by a defined path along the axis of symmetry in relation to that of a first contour region. However, individual points, e.g. corner points, could be defined as reference points. The rotational axis can be formed advantageously by a common centroid axis, i.e. by an axis which leads parallel to the vertical direction through molded region centroids which are located one on top of another. A rotational axis through other definable points is also possible.

In a further advantageous design variant, a bore for receiving a fastening means, the longitudinal axis of which is aligned, in particular, in the direction of the vertical profile, extends through the fitting element. The fastening means, in this case, can be, for example, a screw, a clamping sleeve, a latching element or the like. The fastening means can receive additional advantageous guiding in this way. When the longitudinal axis is aligned in the direction of the vertical profile of the fitting element, this can contribute in an advantageous manner to uniform support of the tool on the tool holder.

When, additionally, a recess is guided from outside to the region between the fitting element and the counter element, this can be advantageous for simple assembly or release. The recess, in this case, is preferably realized in a channel-like manner, for example, as a bore, and can be run through the fitting element and/or the counter element. For release, for example, a fluid, in particular, highly pressurized, can be introduced into the recess. In this case, an inlet and/or fastening attachment for a fluid line can be provided in an advantageous manner at the end of the recess pointing toward the outside. In addition, it is also conceivable for the recess to serve as a tapped hole. For this purpose, a wear protection sensor can be introduced into the recess in order to monitor, in particular, the wear on the tool, or also the inadvertent loss thereof.

For example, a fluid, which can be, for example, compressed air or also water, is introducible through the recess. This can be introduced during release, as a result of which the tool is able to be separated from the tool holder rapidly and, where applicable, without further aid.

In this context, it can be advantageous additionally when the indentation comprises, in relation to the attachment, a setback region for forming a fluid channel between the attachment and the indentation, which is accessible through the recess. The effective area between the fitting element and the counter element can be enlarged as a result of the fluid channel when introducing the fluid, which can additionally facilitate the release.

In addition, the recess can be advantageously designed in order to accommodate a release element or a release element can be arranged in the recess. A threaded screw or a threaded pin, which can be screwed into the recess, designed in the tool as a threaded bore, and which is supported on the surface of the tool holder when being screwed in, is conceivable, for example, as a release element. The tool is separated from the tool holder as a result of the application of force in opposition to the tool holder which is achieved as a result.

A fastening element for connecting the tool to the tool holder can also be introduced through the recess. As a result, a, where applicable further, releasable or also non-releasable connection between the tool and the tool holder can be formed. A threaded element, a clamping sleeve introduced laterally into the recess and/or a latching element can serve, in this case, as a fastening element.

Additional flexibility with the mounting position of the tool with reference to the tool holder is achievable as a result of arranging an intermediate element, in particular, a plate-shaped element, between surfaces of the tool and of the tool holder which are in contact with one another. If an intermediate element is arranged between surfaces, the relevant surfaces are in indirect contact with one another. A change in the distance of the tool with reference to the tool holder can be provided as a result of the intermediate element. In addition, the intermediate element can also be provided with coding elements, such as attachments and/or indentations which correspond to coding elements on the relevant surfaces. A consistent coding of the entire tool system, in this case consisting of tool, intermediate element and tool holder, can be realized in this way.

It is provided in an advantageous design variant that a clamping element is arranged between surfaces of the tool and of the tool holder which are in contact with one another. A cup spring or the like can be used, in this case, as a clamping element. As a result, pre-stressing, which favors or brings about separation during the release of the tool from the tool holder, can be generated when the tool is mounted on the tool holder.

It can be provided in an advantageous manner that the surfaces of the tool and of the tool holder which are in contact with one another in the mounted state comprise one recess or elevation or multiple recesses and/or elevations. In this case, the recesses can be provided, for example, as a grip or undergrip of a release tool in order to separate the tool and tool holder. The elevations can comprise varying designs. In addition, the recesses/elevations can also be used as additional coding elements and/or serve as positioning aids. In this case, a molded part, for example, a dowel pin, which is subsequently introduced into the tool or tool holder and has corresponding recesses, can count as an elevation.

BRIEF DESCRIPTION OF THE DRAWINGS

The present invention is explained in more detail below by way of exemplary embodiments with reference to the drawings.

DETAILED DESCRIPTION OF THE INVENTION

Figure 1:
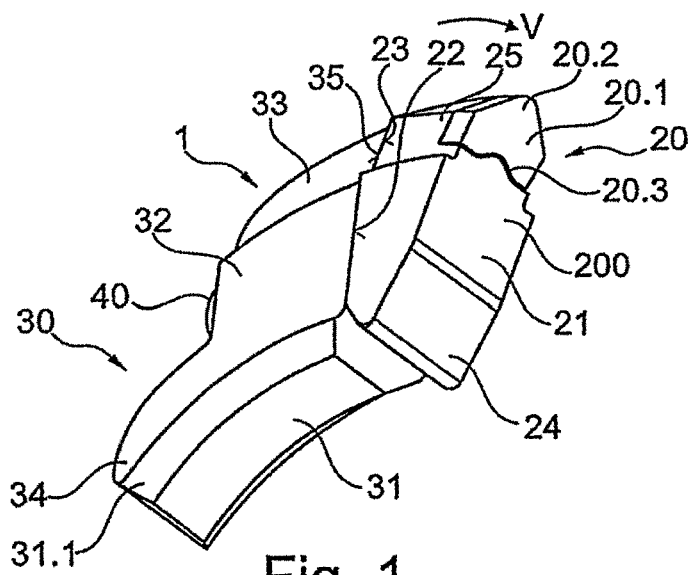
FIG. 1 shows an oblique view from below in perspective of a tool system with a tool and a tool holder.

FIG. 1 shows a tool system 1 with a tool 20 which is fastened releasably on a tool holder 30. The tool 20 includes a tool body 200, on which a machining attachment with a cutting element 20.1 is realized on a head region 25, as an extension of a front side 21 which points in a tool feed direction V. The cutting element 20.1 is fastened, in particular, soldered, on the tool body 200 in a cutting element receiving means 20.3 which is provided for this purpose, and comprises on its end, which is at the top, turned away from the tool body 200 and points in the feed direction V, a tapering and rounded end region 20.2. The cutting element receiving means 20.3 may also be referred to as a receptacle for the cutting element 20.1. The cutting element 20.1 is produced from a hard metal material such that it is suitable, in particular, for machining resistant vegetable and/or mineral materials. On the side located opposite the head region 25, the tool body 200 comprises a projection 24 which extends beyond a support surface 22. The support surface 22 and a contact surface 23, which is inclined in the feed direction V in relation to the support surface, form the surfaces of the tool 20 which are in contact with the tool holder 30.

The tool holder 30 comprises a tool holder body 32, on the top side of which an outer region 33 is integrally formed. The outer region 33 is in contact with the head region 25 by way of a contact counter surface 35 which points in the tool feed direction V. In this case, the outer region 33 is realized as a type of extension of the head region 25, the contour of the outer region 33, which points away from the tool holder 32, extending rearward in a curved manner. An inner region 34 with a tool holder fastening region 31 for fastening on a rotating element of a machine tool, for example, a drum body, is provided on a side of the tool holder body 32 located opposite the outer region 33. The inner region 34 correspondingly comprises at the bottom, pointing in the direction of a rotating element, an arcuate contour which is adapted to the rotating element. An embodiment in which the tool holder 30 is received in an indentation of the rotating element or also of a translational element of the machine tool would also be conceivable or that the tool holder 30 is already integrated into the machine. The tool holder fastening region 31 comprises inwardly pointing chamfers 31.1 which form a welding region for a substance-to-substance bonding connection of the tool system 1 on the machine tool. The welding region, which is located in the feed direction V, is protected by the projection 24 which protrudes over it. For improved hold and support of the tool system 1 on the machine tool, the inner region 34 is extended rearward in the direction opposite to the feed direction V in relation to the remaining tool holder body 32. On the rear side of the tool holder 30 facing away from the feed direction V, the head of a fastening means 40, here a screw, can be seen. The fastening means 40 can also be referred to as a fastener 40. The fastening means 40 is guided by means of a passage 41 through the tool holder 30 into a bore 42 provided in the tool 20 (see FIG. 2). The bore 42 is realized as a threaded bore with a thread 42.1 such that the fastening means 40 pulls the tool 20 with the support surface 22 onto a counter surface 36 of the tool holder 30 for forming a positive locking and/or non-positive locking connection. Other forms of fastening means 40 are also conceivable, for example, one or multiple clamping, tensioning or latching elements, a through bore 42 also being conceivable.

Figure 2:
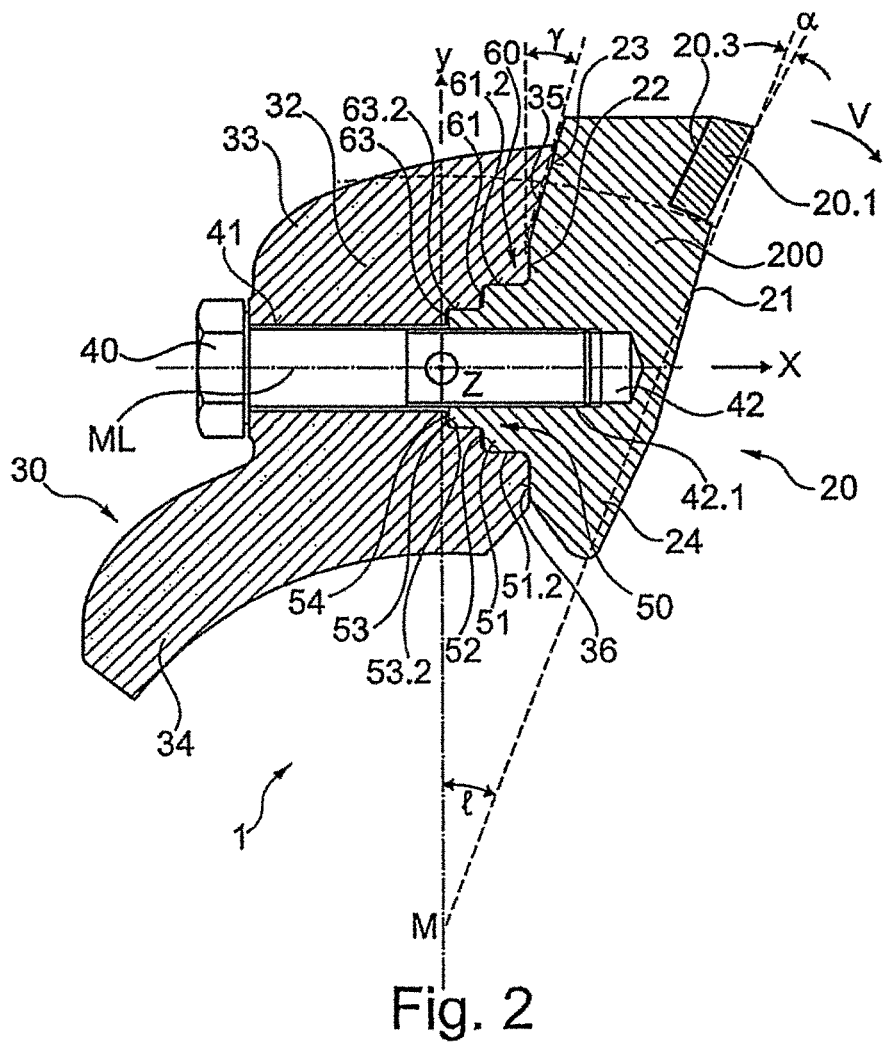
FIG. 2 shows a vertical section of the mounted tool system according to FIG. 1.

FIG. 2 shows a vertical section of the tool system 1. The tool system 1, in this case, is aligned such that the fastening means 40 extends with its longitudinal axis along a horizontal x axis. A y axis, which is aligned correspondingly perpendicularly to the x axis, extends through a center point M of a rotation circle, along which the tool system 1 rotates in operation. A z axis is aligned perpendicularly to the image plane. The tool feed direction V corresponds to the direction of rotation of the tool system 1.

As can be seen in FIG. 2, the end region 20.2 of the cutting element 20.1 lies on a chord through the center point M, which is rotated by an angle φ with reference to the y axis, it being possible for φ to be between −45° and +80°, in particular, between 5° and 30°, for example 21°. With reference to the chord, the front face of the cutting element 20.1 pointing in the feed direction V is inclined by an angle α, where α is between −45° and +75°, in particular, between 0° and 10°, for example 4°. As can be seen further in FIG. 2, the support surface 22 is aligned parallel to the y-z plane which is spanned by the y and the z axes. In relation to the support surface 22, the contact surface 23 is inclined by an angle γ (where γ is between −90° and +90°, in particular, between 5° and 45°). Such an alignment of the two surfaces with respect to one another is conducive, in particular, to simplified assembly, as the angled contact surface 23 guides the tool 20 when inserted into the tool holder 30 into the correct assembly position. In addition, tension and anti-twist protection is achieved, in particular, with lateral torques.

Figure 8:
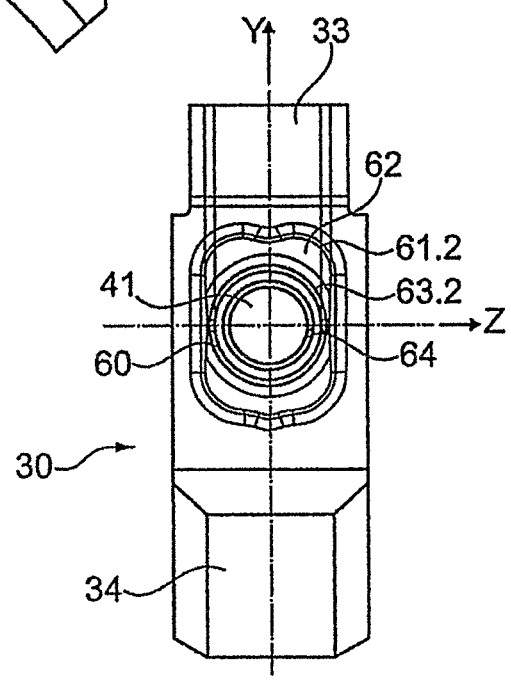
FIG. 8 shows a view from the front of the released tool holder according to FIG. 1, in top view onto a counter element.

A fitting element 50 of the tool 20 extends over the support surface 22, in a direction opposite the feed direction V, into a corresponding counter element 60 of the tool holder 30. The fitting element 50 is realized, for example, as shown in the exemplary embodiment, as an attachment, which can also be referred to as a projection, and the counter element 60 is realized as an indentation. The vertical direction of the fitting element 50, in the direction of which its center longitudinal axis ML is aligned, forms the x axis, the total height H ($H=H_1+H_2$, see FIG. 4) of the fitting element 50 proceeding from the support surface 22 increasing in the direction opposite to the x direction. The fitting element 50 may also be described as projecting from the support surface 22 in a first direction opposite to the x direction. The vertical direction of the fitting element 50 consequently extends perpendicularly to the support surface 22. Via its vertical profile, in the direction opposite to the x direction, the fitting element 50 comprises two molded regions 51, 53 which are each closed off by plateau surfaces 52, 54. The counter element 60 correspondingly comprises two corresponding counter molded regions 61, 63, the vertical profile of which is closed off by plateau counter surfaces 62, 64. The counter molded regions 61, 63 may also be referred to as first and second indentation portions 61, 63. The fitting element 50 and the counter element 60 are dimensioned in such a manner that edge surfaces 51.2, 53.2 of the fitting element 50 are supported in a positive locking and/or non-positive locking manner on corresponding edge counter surfaces 61.2, 63.2. However, the plateau surfaces 52, 54 do not contact the plateau counter surfaces 62, 64. The fitting element 50 and the counter element 60 thus contribute to the positive locking and/or non-positive locking connection between the tool 20 and the tool holder 30. In particular, when the tool 20 is acted upon by shear forces, these can be removed via the edge surfaces 51.2, 53.2 onto the tool holder 30. The design of the fitting element 50 in relation to the counter element 60 could also be shaped in such a manner that the plateau surfaces 52, 54 also contact the plateau counter surfaces 62, 64. Intermediate elements could also be provided between the plateau surfaces 52, 54 and the plateau counter surfaces 62, 64. The design of the fitting element 50 or of the counter element 60 will be described in more detail by way of the following figures. As is shown in FIG. 8 the first indentation portion 61 has a non-circular edge surface 61.2 which is complementary in shape to the non-circular edge surface 51.2 of the first molded region 51 which is received in the first indentation portion 61 such that rotation of the tool 20 relative to the tool holder 30 is prevented.

Figure 3:
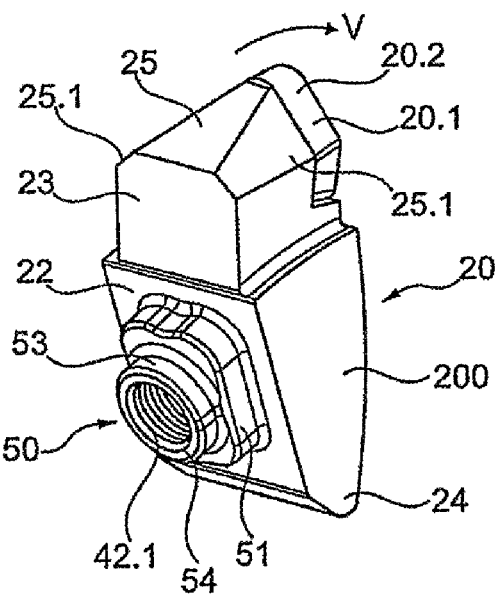
FIG. 3 shows an oblique view from above in perspective of the released tool according to FIG. 1.

FIG. 3 shows a view from above in perspective of the released tool 20. It can be seen from the representation that the lateral surfaces of the head region 25 are realized offset inwardly in relation to the lateral surfaces of the remaining tool body 200. In addition, it is possible to see inclined surfaces 25.1 which broaden forward, extending in the direction of the cutting element 20.1, and merge into the tapering end region 20.2 of the cutting element 20.1. During machining, the form first of all favors a simplified penetration of the machining attachment with the cutting element 20.1 into the material to be machined. During further penetration of the tool 20 into the material to be machined, the fragmentation effect is increased by the cross section of the head region 25 which becomes bigger in the direction opposite to the feed direction V.

In addition, FIG. 3 shows the fitting element 50 with its two molded regions 51, 53, the fitting element extending over the support surface 22 in the direction opposite to the feed direction V.

Figure 4:
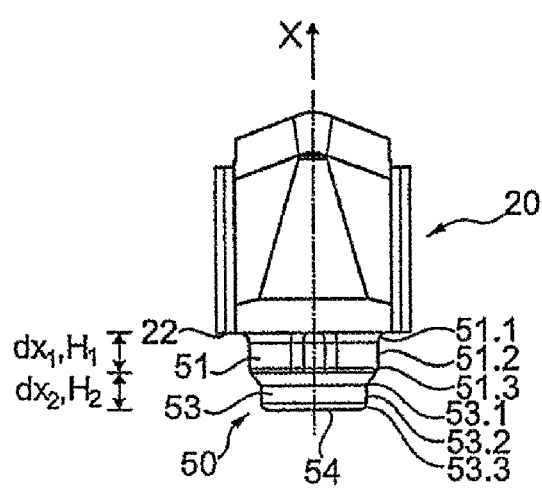
FIG. 4 shows a view from above of the released tool according to FIG. 1.

FIG. 4 illustrates the design of the fitting element 50, a view from above over its vertical profile, with reference to the x direction. Proceeding from the support surface 22, the fitting element 50 first of all merges via a first transition region 51.1 of the fitting element 50, realized as a rounding, into the first molded region 51 which extends over a first vertical region $dx_1$. A first edge surface 51.2, which largely surrounds the first molded region 51 in the vertical direction x, extends parallel to the x direction. Via a first phase 51.3, the first molded region 51 merges in regions into the first plateau surface 52 (see FIG. 5) which is preferably aligned substantially at right angles to the x axis and closes off the molded region 51 vertically. As the height of the fitting element 50 progresses, the first plateau surface 52 merges at least in part into a second transition region 53.1. In the, for example, lateral regions of the fitting element 50, as can be seen in FIG. 4, the phase 51.3 merges directly, without the first plateau surface 52, via the second transition region 53.1 into the second molded region 53. The second molded region 53 extends over a second vertical region $dx_2$ and is surrounded in the vertical direction x largely by a second edge surface 53.2. A second phase 53.3 forms the transition into the second plateau surface 54, which closes off the molded region 53 vertically and also the fitting element 50 in its overall height. The fitting element 50 extends consequently in its overall height from the support surface 22 up to the second plateau surface 54 and is produced from the sum of the heights of the individual molded regions 51, 53, the height of which is in each case $H_1$ (molded region 51) or $H_2$ (molded region 53). The height $H_1$, in this case, is greater than the height $H_2$, identical heights or a reversed height ratio also being conceivable. All in all, a step-like design of the fitting element 50 is thus produced over its height.

Figure 5:
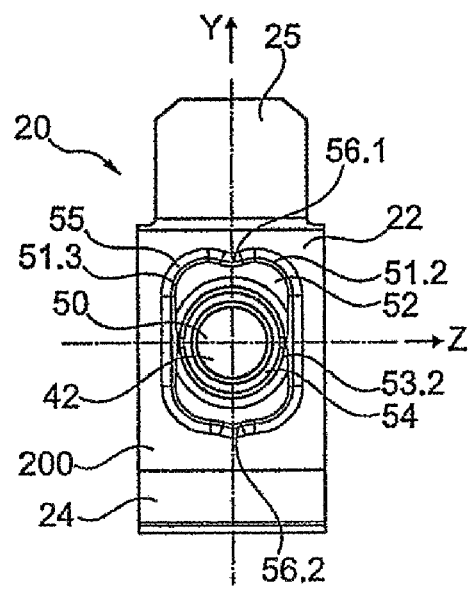
FIG. 5 shows a view from behind of the released tool according to FIG. 1, in top view onto the fitting element.

In the view of the tool 20 from behind shown in FIG. 5, in top view onto the fitting element 50, the external outlines of the molded regions 51, 53, formed by the respective edge surfaces 51.2 or 53.2, can be seen in the y-z direction, at right angles to the x direction. The external outlines form in each case the contour in the y-z direction and outline the surfaces of the molded regions 51, 53 with reference to the y-z direction, which are designated here as contour regions. These outlines in the y-z direction can also be described as being in planes normal to the x direction. The first molded region 51 can be described as having a first contour 51.2 defined as an outline of the first molded region in a first plane normal to the x direction, and the second molded region 53 can be described as having a second contour 53.2 defined as an outline of the second molded region in a second plane normal to the x direction, the first contour being different from the second contour. As is seen in FIG. 5 the first contour 51.2 is non-circular. The contour region of the molded region 51 is realized symmetrically substantially as a type of rectangle with rounded corner regions 55 and an indentation 56.1 pointing in the direction of the head region 25 as well as a bulge 56.2 which points downward. The contour region of the molded region 53 is realized in a slightly oval manner and in top view, which reference to its y-z position, lies inside the external outline or the contour of the molded region 51.

Figure 6:
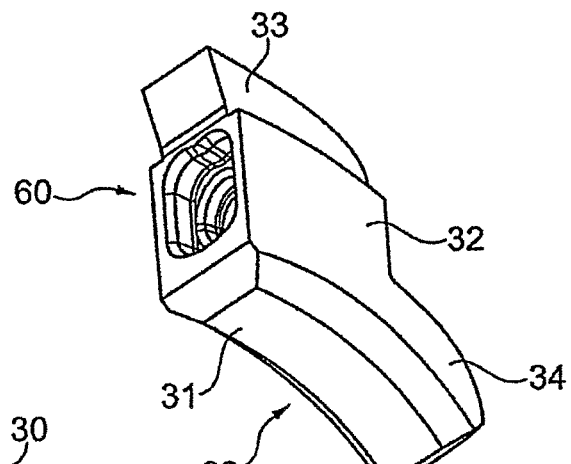
FIG. 6 shows an oblique view from below in perspective of the released tool holder according to FIG. 1.
Figure 7:
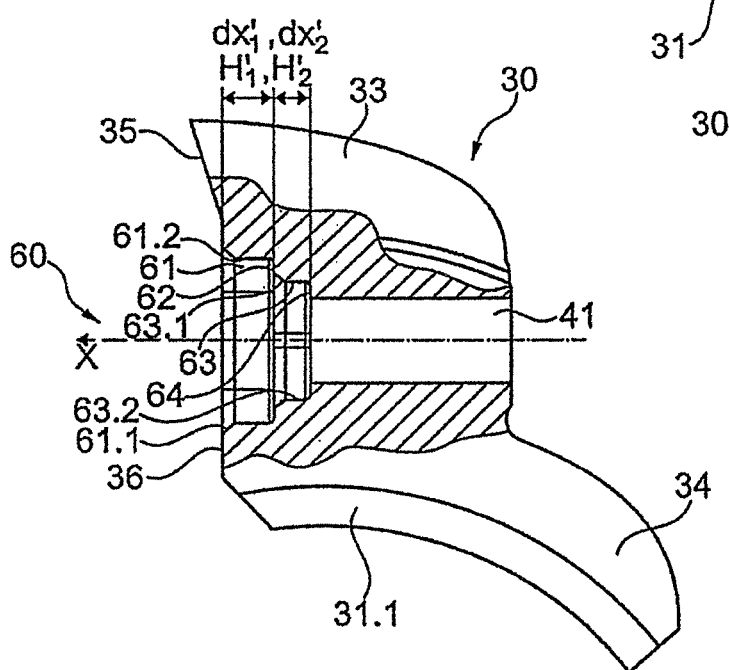
FIG. 7 shows a side view in partial section of the released tool holder according to FIG. 1.

FIGS. 6, 7 and 8 show the released tool holder according to FIG. 1. FIG. 6 shows a view from below of the tool holder 30 in perspective, it being possible to see the counter element 60 in a three-dimensional manner.

FIG. 7 shows a side view of the tool holder 30, it being possible to see the vertical profile of the counter element 60 in the partially sectioned region. Proceeding from the counter surface 36, the counter element 60 merges via a first phase 61.1 into the first counter molded region 61. The counter molded region 61 is located in a vertical region $dx_1'$, inside which it is largely surrounded by a first edge counter surface 61.2. The edge counter surface 61.2, in this case, is aligned parallel to the x direction. Via a rounding, the edge counter surface 61.2 merges into the first plateau counter surface 62 which is aligned at right angles to the x direction and closes off the first counter molded region 61 vertically. Via a second phase 63.1, the counter element 60 then merges into the second counter molded region 63 which is located in a vertical region $dx_2'$ which is connected to the first vertical region $dx_1'$. The second counter molded region 63 is outlined over its vertical profile largely by a second edge counter surface 63.2 which is aligned parallel to the x direction. The edge counter surface 63.2 merges via a further rounding into the second plateau counter surface 64. This is aligned at right angles to the x direction and closes off the second counter molded region 63 vertically. The overall height of the counter element 60 reaches consequently from the counter surface 36 to the plateau counter surface 64 and is the sum of a height $H_1'$ of the first counter molded region 61 and a height $H_2'$ of the second counter molded region 63.

Since, as shown in FIG. 2, the plateau surfaces 52, 54 do not come into contact with the plateau counter surfaces 62, 64, the heights $H_1'$ or $H2'$ of the counter molded regions 61, 63 are greater than the heights $H_1$ or $H_2$ of the corresponding molded regions 51, 53.

FIG. 8 shows the external outlines of the counter molded regions 61, 63 which are formed by the edge counter surfaces 61.2, 63.2 and outline the contour regions. The shaping of the contour regions corresponds to the contour regions of the fitting element 50 and they are simply enlarged in such a manner that the fitting element 50 is able to be inserted with its edge surfaces 51.2, 51.2 into the counter element 60 in contact with the edge counter surfaces 61.2, 63.2.

Figure 9:
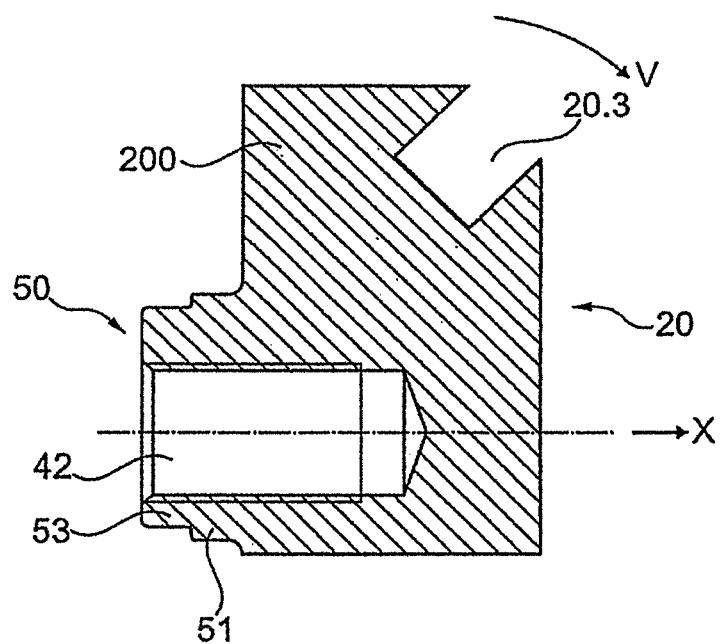
FIG. 9 shows a vertical section of a further realization variant of a tool.
Figure 10:
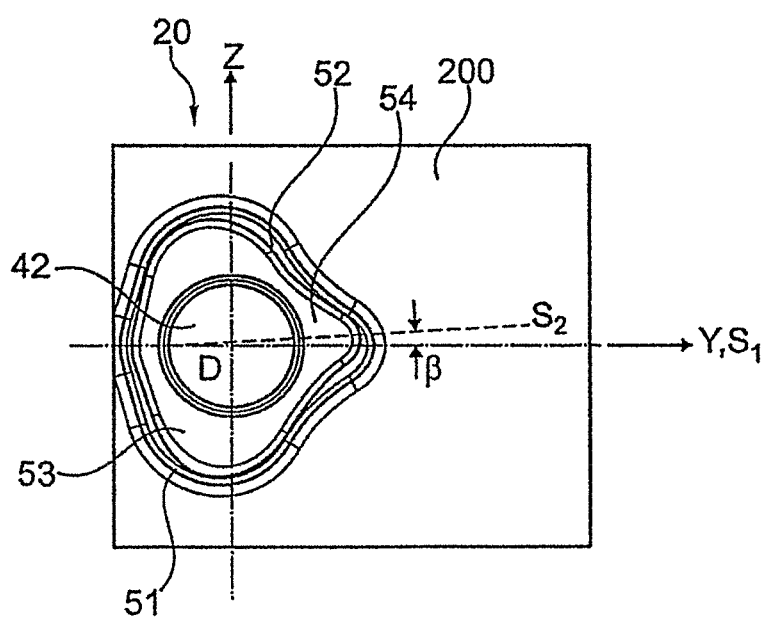
FIG. 10 shows a view from above of the tool according to FIG. 9, in top view onto a fitting element.

FIGS. 9 and 10 show a vertical section (FIG. 9) and a view from behind (in top view onto the fitting element 50) (FIG. 10) of a further exemplary embodiment of a tool 20 according to the present invention for assembly in a tool holder 30. In the case of the tool 20, the cutting element receiving means 20.3 is admitted into the tool body 200 at an angle in the form of an exception. The tool 20, in this case, is realized in a relatively wide manner (in the z direction, see FIG. 10) such that inserting multiple cutting elements 20.1 (not shown here) side by side into the cutting element receiving means 20.3 can be provided. The cutting elements 20.1, in this case, are produced from a hard metal material. Further hard metal elements can be provided on the tool body 200, for example, pointing in the feed direction V, and/or on the lateral surfaces of the tool body 200, in particular, to protect the tool 20 from wear.

FIG. 10 shows the molded regions 51, 53 with their contour regions and the alignment thereof with respect to one another with reference to the y-z directions (at right angles to the vertical profile or to the x direction) in more detail. The contour region of the second molded region 53, in this case, is realized in a substantially geometrically similar manner to the contour region of the first molded region 51, i.e. its form is able to be transposed as a result of displacement, rotation and/or compression/stretching, its surface being a smaller surface here. Each contour region comprises symmetry with respect to its axis of symmetry S1, S2. For describing the alignment of the contour regions with reference to the y-z directions with respect to one another, the axes of symmetry S1, S2 are chosen as reference axes, the axis of symmetry S2 being rotated by an angle β about a rotational axis D in relation to the axis of symmetry S1. In this case, the angle β can be 4°, for example. The rotational axis D is formed here by the center longitudinal axis of the cross section of the bore 42 which extends along the x axis. As a result of the rotated alignment of the contour regions with reference to the y-z directions with respect to one another, in addition to the diverse coding possibilities via the vertical direction (x direction) further coding possibilities in the y or z direction can be added which can be combined. Thus, a defined interface coding between the tool 20 and the tool holder 30 can be set up in three directions in space, tension against torsion at various rotation angles of tool 20 and tool holder 30 also being achievable.

Figure 11:
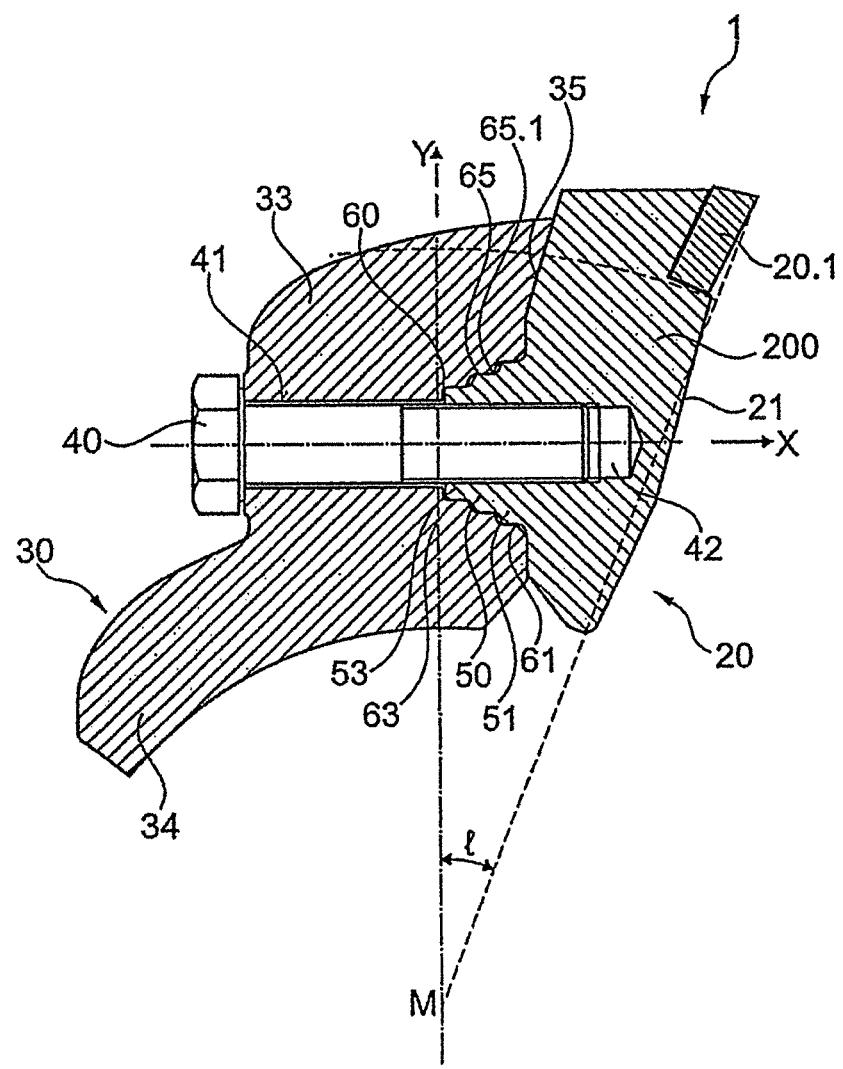
FIG. 11 shows a vertical section of a further realization variant of a mounted tool system.

FIG. 11 shows a vertical section of a further realization variant of the mounted tool system 1. The tool system 1, in this case, corresponds to the tool system 1 according to FIG. 2, except for the designs of the fitting element 50 and of the counter element 60. In this case, a setback, which forms an additional intermediate molded region 65, is provided in the case of the counter element 60 such that in the vertical section a step-like appearance with three steps is produced. The fitting element 50, in contrast, with the two molded regions 51, 53, usually also comprises a 2-step appearance in vertical section. The molded region 51, in this case, is also realized corresponding to the counter molded region 61 and the molded region 53 corresponding to the counter molded region 63. As no corresponding molded region of the fitting element is provided for the intermediate molded region 65, it forms an at least partially circumferential gap 65.1. The circumferential gap 65.1, in this case, can preferably be accessible from outside via a channel-like recess through the tool 20 and/or through the tool holder 30 (not shown here). For release, a fluid can then be supplied through the recess into the region between the fitting element 50 and the counter element 60, which is formed by the circumferential gap 65.1. As a result of the fluid, the tool 20, once the fastening means 40 have been released, can be pressed out of the connection to the tool holder 30. It is also conceivable for a fluid to be supplied during operation for cooling purposes.

Figure 12A:
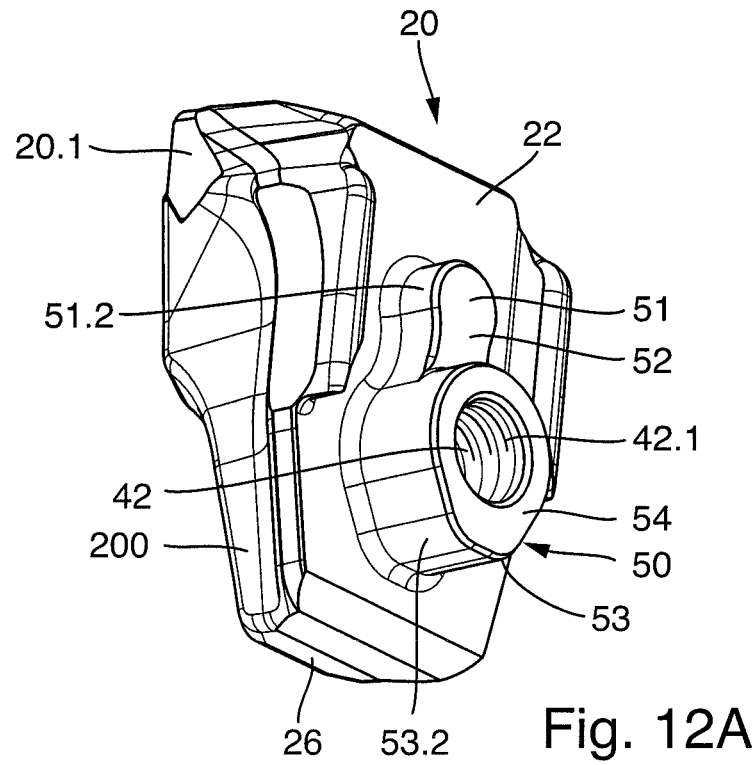
FIGS. 12A and 12B show a perspective view of a further realization variant of a released tool system with a tool (FIG. 12A) and a tool holder (FIG. 12B).
Figure 12B:
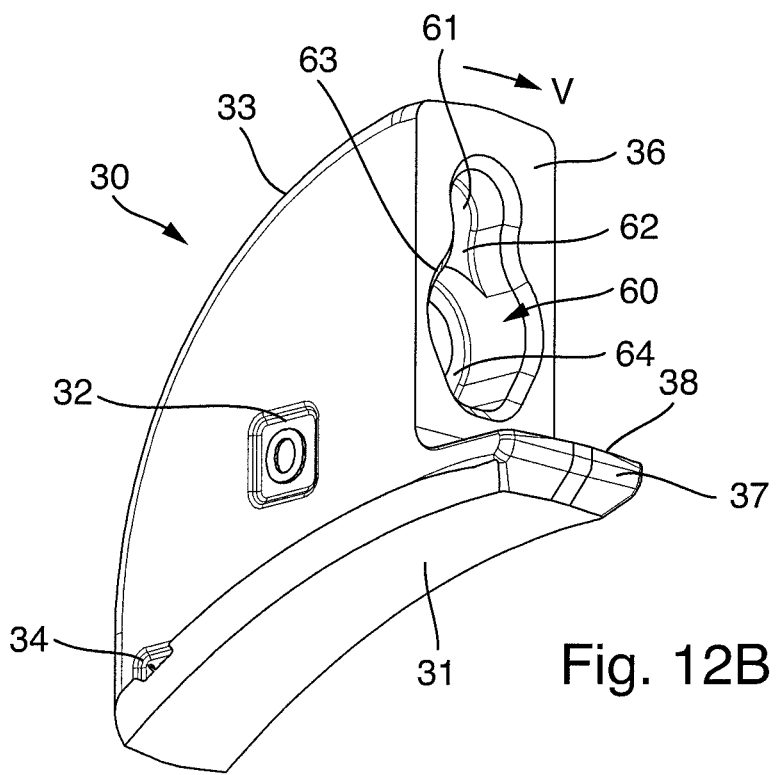

FIGS. 12A and 12B show a perspective view of a further tool system 1 according to the present invention with the tool 20 (FIG. 12A) and the tool holder 30 (FIG. 12B) in the released state. It is to be noted that the tool 20 is shown enlarged compared to the tool holder 30. The fitting element 50 on the tool 20, in this case, comprises a first molded region 51 with a, for instance, drop-shaped contour region. The second molded region 53 with a, for instance, round contour region is positioned, in this case, on the first molded region 51 in such a manner that the contour, that is to say the external outline, of the second molded region 53, in top view onto the fitting element 50, lies in regions on the contour of the first molded region 51. The counter element 60 is realized in a corresponding manner.

In the exemplary embodiment, the tool holder 30 comprises in its inner region 34 a protrusion 37 which points in the tool feed direction V. In this way, the protrusion 37 forms a bottom surface 38 which is aligned substantially at right angles to the counter surface 36, another alignment angle also being conceivable. The bottom surface 38 is in contact with a bottom region 26 of the tool 20 in the mounted state. The bottom surface 38, in this case, presents, for example, additional advantages with reference to simple assembly and/or can act as, where applicable, a further support surface for absorbing forces.

In the embodiments of the tool 20 which are shown as also in other embodiments of the tool, an additional hard metal element, in particular, a hard metal pin, with an emergency operating feature, could also be introduced into the tool body 200. The hard metal element preferably projects into the head region 25 of the tool 20 and beyond the outer region 33 of the tool holder 30. In a case of serious wear in the head region 25, the hard metal element, as a result of material removal, then passes to the surface and there forms protection against further wear of the tool 20. In the case of loss of the cutting element 20, the hard metal element could also provide an emergency operating feature by countering excessive material removal on the tool body 200.

Along with the tools 20 or tool holders 30 shown in the exemplary embodiments, the coding is also usable with differently designed tool systems 1. Thus, for example, further corresponding support surfaces can be provided on the tool holder 30 and/or on the tool 20, for example, also below, pointing in the direction of the machine tool, or on the lateral surfaces, for example, as a result of lateral plates. Further hard metal elements, as already mentioned, can also be provided on the tool 20 and/or on the tool holder 30 which, just as the cutting element 20.1, can be exchangeable. In addition, the coding could also be provided in the case of tool systems 1 which are not realized as interchangeable systems, but where the tool 20 is fastened non-releasably on the tool holder 30 in a first assembly. As a result of the tool 20 according to the present invention or the tool system 1 according to the present invention, it is possible to ensure that suitable tools 20 are used for a machine tool or for a machining task. Ensured reliability and the operating safety of the machine tool used can thus be assured.

The invention claimed is:

1. A tool system for a machine tool for machining vegetable or mineral materials, the tool system comprising:
   a tool holder;
   a tool, including:
      a tool body including a supporting surface, the supporting surface being configured to engage the tool holder and a fitting element projecting from the supporting surface, the fitting element including a first molded region projecting a first distance in a first direction from the supporting surface, and the fitting element including a second molded region projecting from the first molded region a further distance from the supporting surface, wherein the first molded region has a first contour defined as an outline of the first molded region in a first plane normal to the first direction, and the second molded region has a second contour defined as an outline of the second molded region in a second plane normal to the first direction, the first contour being non-circular and different from the second contour; and
      a cutting element configured to be attached to the tool body; and
   wherein the tool holder includes a counter element formed as an indentation in the tool holder, the counter element including first and second indentation portions molded in the tool holder, the first and second indentation portions being configured to receive the first and second molded regions of the tool body, the first indentation portion being non-circular and complementary to the non-circular first contour such that engagement of the non-circular first contour of the first molded region with the non-circular first indentation portion prevents rotation of the tool relative to the tool holder.

2. The tool system of claim 1, wherein:
   the second contour lies inside of or at least in regions on the first contour when viewed looking toward the supporting surface.

3. The tool system of claim 1, wherein:
   the first and second molded regions are at least partly closed off by plateau regions extending normal to the first direction.

4. The tool system of claim 1, wherein:
   the first and second molded regions of the tool body are bordered by edge surfaces extending parallel to the first direction and/or tapering inward with increasing distance from the supporting surface.

5. The tool system of claim 1, wherein:
   the first and second contours are polygonal shaped.

6. The tool system of claim 1, wherein:
   the first and second contours are curved.

7. The tool system of claim 1, wherein:
   the first contour is symmetrical about a first axis of symmetry; and
   the second contour is symmetrical about a second axis of symmetry.

8. The tool system of claim 7, wherein:
   the first and second axes of symmetry of the first and second contours are angularly offset by an angle relative to one another about an axis parallel to the first direction.

9. The tool system of claim 1, wherein:
   the first and second contours are geometrically similar.

10. The tool system of claim 1, wherein:
    the tool body includes a bore having a longitudinal axis extending parallel to the first direction, the bore being configured to receive a fastener fastening the tool body to the tool holder.

11. The tool system of claim 1, wherein:
    the fitting element and the counter element are configured such that when the fitting element is received in the counter element with the supporting surface of the tool body engaging the tool holder an at least partially circumferential gap is defined between the fitting element and the counter element, the at least partially circumferential gap being communicated with an exterior of the tool system so that a fluid is introducible into the at least partially circumferential gap.

12. The tool system of claim 11, wherein:
    a fastener for fastening the tool body to the tool holder is introducible through a bore in the tool body, and the bore communicates with the at least partially circumferential gap.

13. A tool for fastening to a tool holder of a machine tool for machining vegetable or mineral materials, the tool comprising:
- a tool body including:
  - a receptacle defined in the tool body and configured to receive a cutting element pointing in a tool feed direction;
  - a supporting surface facing away from the tool feed direction for engagement with the tool holder;
  - a fastener receiving bore defined in the tool body and extending through the supporting surface, the fastener receiving bore having a longitudinal bore axis; and
  - a fitting element projecting from the supporting surface, the fitting element including a first molded region extending from the supporting surface and projecting a first distance in a first direction parallel to the longitudinal bore axis from the supporting surface, and the fitting element including a second molded region projecting from the first molded region a further distance from the supporting surface, wherein the first molded region has a first contour defined as an outline of the first molded region in a first plane normal to the first direction, and the second molded region has a second contour defined as an outline of the second molded region in a second plane normal to the first direction, the first contour being non-circular and different from the second contour;
  - wherein the first contour is symmetrical about a first axis of symmetry;
  - wherein the second contour is symmetrical about a second axis of symmetry; and
  - wherein the first and second axes of symmetry of the first and second contours are angularly offset by an angle relative to one another about an axis parallel to the first direction.

14. The tool of claim 13, wherein:
the second contour lies inside of or at least in regions on the first contour when viewed looking toward the supporting surface.

15. The tool of claim 13, wherein:
the first and second molded regions are at least partly closed off by plateau regions extending normal to the first direction.

16. The tool of claim 13, wherein:
the first and second molded regions of the tool body are bordered by edge surfaces extending parallel to the first direction and/or tapering inward with increasing distance from the supporting surface.

17. The tool of claim 13, wherein:
the first and second contours are polygonal shaped.

18. The tool of claim 13, wherein:
the first and second contours are curved.

19. The tool of claim 13, wherein:
the first and second contours are geometrically similar.

* * * * *